United States Patent
Yang et al.

(10) Patent No.: US 12,421,418 B2
(45) Date of Patent: Sep. 23, 2025

(54) AQUEOUS COATING COMPOSITION AND COATING AND ARTICLE FORMED THEREFROM

(71) Applicant: GUANGDONG HUARUN PAINTS CO., LTD, Foshan (CN)

(72) Inventors: Wei Yang, Shanghai (CN); Hong Chen, Foshan (CN); Naiwo Yu, Shanghai (CN)

(73) Assignee: SWIMC LLC, Cleveland, OH (US)

( * ) Notice: Subject to any disclaimer, the term of this patent is extended or adjusted under 35 U.S.C. 154(b) by 688 days.

(21) Appl. No.: 17/578,905

(22) Filed: Jan. 19, 2022

(65) Prior Publication Data

US 2022/0235243 A1    Jul. 28, 2022

(30) Foreign Application Priority Data

Jan. 27, 2021   (CN) .......................... 202110116101.5

(51) Int. Cl.
| | | |
|---|---|---|
| C09D 175/04 | (2006.01) | |
| C09D 5/00 | (2006.01) | |
| C09D 7/20 | (2018.01) | |
| C09D 7/65 | (2018.01) | |

(52) U.S. Cl.
CPC ............ *C09D 175/04* (2013.01); *C09D 5/00* (2013.01); *C09D 7/20* (2018.01); *C09D 7/65* (2018.01)

(58) Field of Classification Search
None
See application file for complete search history.

(56) References Cited

U.S. PATENT DOCUMENTS

| | | | | |
|---|---|---|---|---|
| 5,006,405 A | * | 4/1991 | Watkins | B65D 81/3446 428/323 |
| 7,118,797 B2 | | 10/2006 | Crum | |
| 2018/0312717 A1 | | 11/2018 | Niu et al. | |

FOREIGN PATENT DOCUMENTS

| | | | | |
|---|---|---|---|---|
| CN | 101918221 A | 12/2010 | | |
| CN | 102918097 | 2/2013 | | |
| CN | 105670438 | 6/2016 | | |
| CN | 105968335 | 9/2016 | | |
| CN | 107779078 | 3/2018 | | |
| CN | 108912774 | 11/2018 | | |
| CN | 06243984 | 1/2019 | | |
| CN | 109135540 | 1/2019 | | |
| CN | 109456669 | 3/2019 | | |
| CN | 109593452 A | 4/2019 | | |
| CN | 110066591 | 7/2019 | | |
| CN | 209159082 | 7/2019 | | |
| DE | 102019000203 A1 | 7/2020 | | |
| EP | 0799837 A2 | 10/1997 | | |
| EP | 0969056 A1 | 1/2000 | | |
| EP | 3366707 A1 | 8/2018 | | |
| GB | 1157040 A | 7/1969 | | |
| JP | 3590017 B2 | * | 11/2004 | ............ C08F 261/04 |
| WO | 2011045064 A1 | 4/2011 | | |
| WO | 2018122521 A1 | 7/2018 | | |
| WO | 2020125714 A1 | 6/2020 | | |

OTHER PUBLICATIONS

JP 3590017 B2 English translation (Year: 2004).*
Anonymous, "Starches For Textile Industry", Agrana Starch, Gmuend, Austria Apr. 1, 2017 (Apr. 1, 2017), p. 1-8.

* cited by examiner

*Primary Examiner* — Jeffrey D Washville

(57) ABSTRACT

The present application is directed to an aqueous coating composition and coating and article formed therefrom. In particular, the aqueous coating composition comprises component A comprising a film-forming resin composition, at least one starch, optional aqueous carriers, and optional additional additives; wherein the at least one starch is present in an amount of 2-20% by weight, preferably in an amount of 4-10% by weight relative to the total weight of the component A, and wherein the coating formed by the aqueous coating composition has a 60° gloss of no more than 5° using ASTM D523. The present application is further directed to a coating and article formed from the aqueous coating composition, wherein the coating and article have a haptic effect.

14 Claims, No Drawings

AQUEOUS COATING COMPOSITION AND COATING AND ARTICLE FORMED THEREFROM

TECHNICAL FIELD

The present application relates to an aqueous coating composition and more specifically to an aqueous coating composition capable of producing a haptic effect and a coating and article made therefrom.

BACKGROUND

With the gradual improvement of people's living standards, coatings continue to develop in a more comfortable, fashionable and personalized direction. People's requirements for the appearance of products have also increased, not only for the appearance of bright colors, but also for a hand-feeling of the products. The increasing desire to offer a soft-touch feeling is a global trend that is occurring in a large number of applications, including consumer electronics (e.g., notebooks, mobile phone casings), wooden furniture, appliances (e.g., ovens, coffee machines), automotive interiors (e.g., panels, holders, arm rests), clothing (such as sports shoes), packaging (e.g., cosmetic bottles/caps, bags), and textured films for in-mold decoration/in-mold labeling (IMD/IML). In this case, ordinary coating compositions will not be able to meet the high-grade requirement.

At present, in addition to the attractive visual design of the haptic coating, a strong focus is on the touch experience of final products. After a haptic coating is applied, the surface of the resulting coating can achieve a variety of haptic sensations, including but not limited to soft-touch nubuck-like effects, smooth, slippery, sticky effects or rough sandpaper-like effects. Moreover, the haptic coating may combine with attractive colors such as metallics, color shifting or thermochromic colors and finishes with controlled matte or glossy surfaces to achieve a huge freedom of design. Therefore, there is a strong demand for haptic coatings in the coating industry.

In the current coating market, coating compositions capable of forming haptic coatings are very limited, far from being able to meet market demand. Therefore, there is an urgent need to develop a new type of coating composition capable of producing a haptic effect to meet the above application requirements.

SUMMARY

In one aspect, the present application provides an aqueous coating composition comprising: component A comprising a film-forming resin composition, at least one starch, optional aqueous carriers, and optional additional additives; wherein the at least one starch is present in an amount of 2-20% by weight, preferably in an amount of 4-10% by weight relative to the total weight of the component A, and wherein the coating formed by the aqueous coating composition has a 60° gloss of no more than 5° using ASTM D523. In one embodiment of the present application, the aqueous coating composition is a one-component aqueous coating composition. In another embodiment of the present application, the aqueous coating composition further includes component B, which is a two-component aqueous coating composition.

In another aspect, the present application provides a coating formed from the above-mentioned aqueous coating composition, wherein the coating has a haptic effect.

In still another aspect, the present application also provides an article comprising a substrate having at least one major surface; and at least one layer of coating, the coating being formed from the aforementioned aqueous coating composition which is directly or indirectly coated on the main surface. Preferably, the substrate comprises wood, metal, plastic, leather, fabric, ceramic, cementious substrate or any combination thereof.

It was surprisingly discovered that incorporating a certain amount of unmodified starch in powder form into conventional emulsions, especially aqueous polyurethane dispersions and/or aqueous polyurethane-acrylic resin dispersions may obtain an aqueous coating composition capable of achieving a haptic effect, which greatly simplifies the preparation process of a haptic coating and expands the operating space. The resulting aqueous coating composition not only has the original performance of the paint film, but also improves the haptic effect and scratch resistance of the paint film, which was difficult to anticipate prior to the present application. In one embodiment of the present application, the coating formed by the coating composition according to the present application not only maintains excellent transparency and excellent durability, but also has haptic effects including delicate, soft and smooth touch close to the skin and/or ultra-matte gloss (for example, a gloss of 2-5° at 60° using ASTM D523) and excellent hardness and/or scratch resistance.

The details of one or more embodiments of the present disclosure are set forth in the description below. Other features, objects, and advantages of the present disclosure will be apparent from the description, and from the claims.

Definition

As used herein, "a", "an", "the", "at least one", and "one or more" are used interchangeably. Thus, for example, a composition that comprises "an" additive can be interpreted to mean that the composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not, specifically mentioned, as along as such components or steps do not affect the basic and novel characteristics of the present disclosure, but it is also contemplated that the compositions or processes may consist essentially of, or consist of, the recited components or steps.

The term "comprises", "comprising", "contains" and variations thereof do not have a limiting meaning where these terms appear in the description and claims.

As used therein, "coating" and "paint film" have the same meaning, both of which are formed by applying and drying an aqueous coating composition.

In the context of the present application, the term "haptic coating" refers to a coating that can give human skin a certain haptic sensation. Haptic sensation is caused by slight mechanical stimulation of receptors on the surface of human skin. Considering the fact that these receptors vary from person to person, each individual has a different interpretation of haptic properties, so the haptic scale is usually rather broad including but not limited to smooth/velvety effects, silky effects, rubbery and tacky effects, soft sandpaper-like effects and rough sandpaper-like effects, and the like.

When used for "aqueous coating composition", the phrase "the coating formed from the aqueous coating composition has a 60 degree gloss of not higher than 5°"' means that the coating formed from the aqueous coating composition has a very low gloss effect and shows ultra-matte properties.

When used for "starch", the term "acidity" is a parameter used to measure the composition of starch products. Generally, the lower the acidity, the fewer impurities of the starch product are and the better quality of the starch product is.

When used for "starch", the term "fineness" is a parameter used to measure the particle size of starch products. Generally, the higher the fineness, the less agglomeration of starch products particles is and the narrower particle distribution is.

In the context of this application, the term "amylose" refers to a starch that is only soluble in hot water in a small amount and is not easy to form a paste. After the solution is placed, the starch crystals will be precipitated again. In contrast, the term "amylopectin" refers to a starch that is easily soluble in water to form a stable paste, and the solution does not precipitate after standing. In one embodiment of the present application, the starch used is a mixture of amylose and amylopectin.

In the context of the present application, the term "hand-feeling agent" includes silicone hand feeling agents, fluff powder and wax emulsion hand-feeling agents. When used for "aqueous coating composition", the term "substantially free of hand-feeling agent" means that the components of the aqueous coating composition and the formulated coating composition do not contain any additional added hand-feeling agent, and preferably does not contain any hand-feeling agents known in the art. When the phrase "substantially free" is used herein, such phrases are not intended to exclude the presence of trace amounts of related hand-feeling agents that may exist as environmental pollutants or due to environmental pollution.

In the context of the present application, the term "matting agent" includes silica matting agents, synthetic wax matting agents and stearate salts matting agents. In some embodiments of the present application, the aqueous coating composition is substantially free of matting agents. In these embodiment, the phrase "the aqueous coating composition is substantially free of matting agents" means that the components of the aqueous coating composition and the formulated coating composition do not contain any additional matting agents mentioned above, and preferably does not contain any matting agents known in the art. When the phrase "substantially free" is used herein, such phrases are not intended to exclude the presence of trace amounts of related matting powders that may exist as environmental pollutants or due to environmental pollution. In other embodiments of the present application, the aqueous coating composition may include a matting agent.

When used for "aqueous coating composition", the term "substantially free of" certain components means that the aqueous coating composition of the present application contains no more than 0.1% by weight, preferably no more than 0.05% by weight, more preferably no more than 0.01% by weight of the component relative to the total weight of the aqueous coating composition.

In the context of the present application, the term "one-component aqueous coating composition" refers to an aqueous coating composition that itself can be dried and cured to form coatings with required mechanical properties (such as hardness), without assistance of an additional curing agent.

In the context of this application, the term "two-component aqueous coating composition" refers to an aqueous coating composition that is composed of two or more separately stored components, whereby the components of these coating compositions are mixed together during use, and can be dried and cured within an acceptable period of time to form a coating with required mechanical properties (such as hardness).

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

The terms "preferred" and "preferably" refer to embodiments of the present disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

DETAILED DESCRIPTION

According to an embodiment of the present application, there is provided an aqueous coating composition comprising: component A, comprising a film-forming resin composition, at least one starch, optional aqueous carriers, and optional additional additives; wherein the at least one starch is present in an amount of 2-20% by weight, preferably in an amount of 4-10% by weight relative to the total weight of the component A, and wherein the coating formed from the aqueous coating composition has a 60° gloss of no more than 5° using ASTM D523. In an embodiment according to the present application, the component A contained in the aqueous coating composition comprises a certain amount of at least one starch. It was surprisingly discovered that a certain amount of unmodified starch in powder form may be mixed into conventional emulsions to form an aqueous coating composition so that the resulting aqueous coating composition not only has the original performance of the paint film, but also improves the haptic effect and scratch resistance of the paint film, which was difficult to anticipate prior to the present application. Without being bound by any theory, it is speculated that during the film forming process, the at least one starch in the resulting aqueous coating composition is evenly distributed on the surface of the paint film along with the flow of emulsion, thereby forming a very thin layer of soft starch coating, thus the resulting coating shows a haptic effect.

As we all know, defining the haptic properties of coatings has always been a challenging task. Haptic sensation is caused by slight mechanical stimulation of receptors on the surface of human skin. Considering the fact that these receptors vary from person to person, each individual has a different interpretation of haptic properties, so the haptic scale is usually rather broad including but not limited to smooth/velvety effects, silky effects, rubbery and tacky effects, soft sandpaper-like effects and rough sandpaper-like effects, and the like. When measuring the haptic properties of a coating, it is important to have a well-trained observer, who usually has touched a coating that is recognized as having a haptic effect. In some embodiments according to the present application, the haptic performance of the coating formed from the aqueous coating composition according to the present application is determined by the test method of haptic performance as described in the Examples section, and is classified into grades 1 to 5. The higher the level, the easier it is to perceive the haptic effect. In one embodiment of the present application, the coating formed from the aqueous coating composition according to the present application has a haptic effect of grade 4 or higher. Preferably, the coating formed from the aqueous coating composition of the present application has a haptic effect of grade 4.5 or higher. Even more preferably, the coating formed from the aqueous coating composition of the present application has a haptic effect of grade 5.

In addition to the above-mentioned haptic effects, the coating formed from the aqueous coating composition according to the present application also has a 60-degree gloss of not higher than 5° using ASTM D523, and exhibits an ultra-matte effect. Preferably, the paint film formed from the aqueous coating composition of the present application preferably has a 60-degree gloss of no higher than 4.5°, more preferably a 60-degree gloss of no higher than 4°, still more preferably a 60-degree gloss of no higher than 3.5° and even more preferably a 60-degree gloss of no higher than 3°. In contrast, conventional coatings with super-matte properties on the market do not have both super-matte effects and haptic effects, simultaneously.

Surprisingly, the coating formed from the aqueous coating composition according to the present application has such an ultra-matte effect. In the coating industry, in order to obtain a coating with ultra-matte properties, it is usually necessary to add a certain amount of matting agent to coating composition. However, it was found that the aqueous coating composition comprising a certain amount of at least one starch according to the present application can achieve an ultra-matte effect without substantially containing a matting agent, that is, the coating formed from the aqueous coating composition may have a 60° gloss not exceeding 5° using ASTM D523. Therefore, in some embodiments of the present application, the aqueous coating composition is substantially free of a matting agent. Preferably, the aqueous coating composition is free of a matting agent, and the coating formed from the aqueous coating composition has a 60° gloss in the range of 3° to 5° using ASTM D523.

In addition, it was surprisingly discovered that adding a certain amount of matting agent to the aqueous coating composition according to the present application can further reduce the gloss of the coating formed therefrom. Therefore, in some embodiments of the present application, the aqueous coating composition contains a matting agent, preferably in an amount of 0.1% by weight or more, preferably 0.5% by weight or more, more preferably 1% by weight or more relative to the total weight of the aqueous coating composition, so that the coating formed from the aqueous coating composition has a 60° gloss of not more than 3° using ASTM D523.

In an embodiment according to the present application, relative to the total weight of the component A, the at least one starch is present in an amount of 2-20% by weight, preferably in an amount of 4-10% by weight. The amount of at least one starch is appropriate within the above range. If the amount of starch is too high, the viscosity of the obtained aqueous coating composition is too high, and it is not easy to form a film; and if the amount of starch is too low, the obtained aqueous coating composition cannot exhibit sufficient haptic effects. In some embodiments of the present application, relative to the total weight of the aqueous coating composition, the at least one starch is present in an amount of 2-18% by weight, 2-15% by weight, 2-12% by weight, 2-10% by weight, 2-9% by weight, 2-8% by weight, 2-7% by weight, 2-6% by weight, 2-5% by weight, 3-10% by weight, 3-9% by weight, 3-8% by weight, 3-7% by weight, 3-6% by weight, 3-5% by weight, 4-10% by weight, 4-9% by weight, 4-8% by weight, 4-7% by weight, 4-6% by weight, 4-5% by weight, 5-10% by weight, 5-9% by weight, 5-8% by weight, 5-7% by weight, 5-6% by weight, or in an amount within the range of any value within the above range.

In some embodiments according to the present application, the at least one starch has relatively low acidity, for example having less than or equal to 2.0 according to GB/T8885-2008, in which the acidity refers to the amount of aqueous sodium hydroxide solution with a molar concentration of 0.1 mol/L in milliliter consumed by neutralizing 10 grams of the starch without water. As mentioned above, acidity is a parameter used to measure the composition of starch products. The acidity is tested by titration according to GB/T8885-2008. It has been found that the acidity of at least one starch will have a certain impact on the haptic effect of the coating formed from the aqueous coating composition. Starches with lower acidity are preferred. More preferably, the starch has an acidity of 1.5 or less, for example, 1.49 or less, 1.48 or less, or 1.47 or less.

In some embodiments according to the present application, the at least one starch has a smaller particle size, for example, having a fineness of 99.5% or higher passing through a 100-mesh screen. As mentioned above, fineness is a parameter used to measure the particle size of starch products. The fineness is determined according to GB/T8885-2005 by using the percentage of starch products passing through a specific mesh screen. It was surprisingly found that incorporating at least one starch product with higher fineness into an aqueous coating composition is advantageous for forming a coating with a haptic effect. Therefore, in a preferred embodiment according to the present application, the at least one starch has a fineness of 99.7% or higher passing through a 100 mesh screen, and more preferably a fineness of 99.9% or higher passing through a 100 mesh screen.

In some embodiments according to the present application, the at least one starch comprises amylose, amylopectin or a combination thereof. Preferably, the at least one starch comprises a mixture of amylose and amylopectin. In a preferred embodiment, the at least one starch comprises, relative to the total weight of the starch, amylose in an amount of 20% to 40% by weight and amylopectin in an amount of 60% to 80% by weight. It was unexpectedly found that incorporating at least one starch constituting by amylose and amylopectin in the above proportions into an aqueous coating composition is advantageous for forming a coating with a haptic effect. If the content of amylose is too high, the solubility of at least one starch in the aqueous coating composition is too low, and it is easy to settle, which is not conducive to the formation of a stable aqueous coating composition; and if the content of amylose is too low, the starch is difficult to crystallize to form a stable starch layer during the film forming process of the aqueous coating composition, which is not conducive to obtaining a coating with a haptic effect. Therefore, in a preferred embodiment according to the present application, at least one starch having the above-mentioned composition is preferred. In a particularly preferred embodiment according to the present application, the at least one starch comprises, relative to the total weight of the at least one starch, amylose in an amount of 25% to 32% by weight and amylopectin in an amount of 68% to 75% by weight.

In some embodiments according to the present application, the at least one starch is selected from one or more of corn starch, potato starch, wheat starch, rice starch, tapioca starch, oat starch, and sorghum starch, preferably selected from one or more of corn starch, tapioca starch and potato starch, more preferably from corn starch.

In an embodiment according to the present application, the component A is a composition that constitutes the main body of the coating formed from the aqueous coating composition, which can be dried, crosslinked or hardened otherwise by itself or as needed together with a suitable curing agent, so that a non-tacky continuous film is formed on the substrate. In addition to the at least one starch mentioned above, the component A further comprises a film-forming resin composition, optional aqueous carriers, and optional additional additives.

In some embodiments according to the present application, the film-forming resin composition is present in the form of an aqueous dispersion of polymer particles. As used herein, the term "aqueous dispersion of polymer particles" refers to a stable dispersion of synthetic resin (i.e. polymer) in the form of microparticles in an aqueous liquid medium, optionally with the aid of a suitable dispersing aids such as surfactant. Therefore, when used for polymers in the present application, unless otherwise stated, the terms "aqueous latex" and "aqueous dispersion" can be used interchangeably. The process for preparing an aqueous latex is known in the art, for example, it can be prepared by the emulsion polymerization process known to those skilled in the art. The emulsion polymerization preparation process usually comprises the following steps: optionally under the action of a suitable emulsifier and/or dispersion stabilizer and with the aid of stirring, dispersing polymerizable monomers in water to form an emulsion, and polymerizing the monomers for example, by adding an initiator so as to initiate the polymerization.

It is well known that the polymer particles in the aqueous latex can be modified to obtain an aqueous latex with desired properties. In one embodiment of the present application, the polymer particles are modified by active hydrogen functional groups. The active hydrogen in one aspect can be provided by functional groups such as —COOH, —OH, —SH, secondary amino groups, and primary amino groups. In addition, some functional groups, such as ester groups (especially carboxylic acid ester groups), thioether groups, or acid anhydride groups (especially carboxylic acid anhydride groups), can be converted into functional groups capable of providing active hydrogen, for example, by hydrolysis. Therefore, in the present application, polymer particles with one or more active hydrogen functional groups refer to any polymer particles that themselves contain functional groups capable of providing active hydrogen and/or any polymer particles comprising functional groups that can be converted into active hydrogen during its preparation and/or application.

In an embodiment according to the present application, an aqueous dispersion of polymer particles is regarded as a film-forming resin composition in an aqueous coating composition. On the one hand, the resin composition is used as an adhesive to provide adhesion between paint film and substrate, and to keep the components (such as fillers) in the aqueous coating composition together to give the paint film a certain degree of cohesive strength. On the other hand, such polymer particles can react with an appropriate curing agent as needed to achieve cross-linking of polymer chains, thereby achieving a coating with high mechanical strength.

In some embodiments of the present application, the polymer particles in the aqueous latex may have one or more active hydrogen functional groups selected from —COOH, —OH, —SH, secondary amino groups and primary amino groups.

In some preferred embodiments of the present application, the aqueous dispersion of polymer particles includes one or more of an aqueous dispersion of acrylics resin, an aqueous dispersion of polystyrene-acrylics resin, an aqueous dispersion of polyurethane, an aqueous dispersion of polyurethane-acrylic resin, an aqueous dispersion of epoxy resin, an aqueous dispersion of polyester, an aqueous dispersion of polyvinyl acetate, and an aqueous dispersion of polysiloxane, preferably one or more of an aqueous dispersion of acrylics resin, an aqueous dispersion of polystyrene-acrylics resin, an aqueous dispersion of polyurethane, and an aqueous dispersion of polyurethane-acrylics resin, more preferably one or two of an aqueous dispersion of polyurethane and an aqueous dispersion of polyurethane-acrylics resin.

In an embodiment according to the present application, the polymer particles in the aqueous dispersion have a certain range of particle diameters, which can be measured by the Z average particle diameter known in the art, which means the particles size as measured by a dynamic light scattering method, for example, with a Marvlen Zetasizer 3000HS microscopic particle size analyzer. Preferably, the polymer particles of the aqueous dispersion may have a particle size in the range of 50 nm to 200 nm. It has been surprisingly discovered that an aqueous dispersion of polymer particles having the above-mentioned particle size range is particularly suitable for formulating an aqueous coating composition, and the aqueous coating composition formulated therefrom has suitable rheology and coat-ability.

In an embodiment of the present application, the aqueous dispersion of polymer particles has a solid content of 30-50%. From the perspective of industrial practice, an aqueous dispersion of polymer particles with the above solid content is readily available. The above-mentioned aqueous dispersion of polymer particles can be self-made or are commercially available products. As an exemplary illustration, Dow3311 acrylics aqueous dispersion commercially available from Dow, Allnex6716 acrylics aqueous dispersion commercially available from Allnex, and DSM E129 polyurethane polyacrylate aqueous dispersion commercially available from DSM, DSM 82180 polyurethane aqueous dispersion commercially available DSM, or Alberdingk U9900 polyurethane aqueous dispersion commercial available from Opel Di can be given.

According to an embodiment of the present application, the amount of one or more aqueous dispersions of polymer particles can be varied within a wide range, and the total amount of the aqueous dispersions of polymer particles can be in the range of about 60 wt % to about 85 wt % relative to the total weight of the component A. In some embodiments, the amount of the aqueous dispersions of polymer particles may be in the range of 75 wt % to 85 wt %.

In some embodiments according to the present application, the aqueous coating composition is a one-component coating composition, and is consisted of the component A as described above wherein the component A comprises a film-forming resin composition, at least one starch, optional aqueous carriers, and optional additional additives. In these embodiments, the component A can be cured into a film by means such as self-crosslinking or latex entanglement.

In other embodiments according to the present application, the aqueous coating composition is a two-component coating composition, comprising a component A and a component B as described above, wherein the component A comprises a film-forming resin composition, at least one starch, optional aqueous carriers, and optional additional additives, and the component B comprises a curing agent. Prior to construction, the component A and the component B are mixed, and then the resulting mixture is applied. The type of the curing agent depends on the nature of the resin composition. The coating composition containing amino and/or hydroxyl functional resin preferably adopts isocyanate and isocyanurate as curing agents. Suitable isocyanate curing agents are aliphatic, cycloaliphatic and aromatic polyisocyanates, such as trimethylene diisocyanate, 1,2-propylene diisocyanate, tetramethylene diisocyanate, 2,3-butylene diisocyanate, hexamethylene diisocyanate, octamethylene diisocyanate, 2,4-trimethylhexamethylene diisocyanate, 2,4,4-trimethylhexamethylene diisocyanate, dodecamethylene diisocyanate, 1,3-cyclopentylidene diisocyanate, 1,2-cyclohexylidene diisocyanate, 1,4-cyclohexylidene diisocyanate, 4-methyl-1,3-cyclohexylidene diisocyanate, meta- and p-phenylene diisocyanate, 1,3- and 1,4-bis(isocyanate methyl)benzene, 1,5-dimethyl-2,4-bis(isocyanate methyl)benzene, 1,3,5-triisocyanatebenzene, 2,4-toluene diisocyanate, 2,6-toluene diisocyanate, 2,4,6-toluene triisocyanate, $\alpha,\alpha,\alpha',\alpha'$-tetramethyl o-, m- and p-xylylene diisocyanate, 4,4'-diphenylene diisocyanate methane, 4,4'-diphenylene diisocyanate, 3,3'-dichloro-4,4'-diphenylene diisocyanate, naphthalene-1,5-diisocyanate, isophorone diisocyanate, trans-vinylidene diisocyanate, and mixtures of the above-mentioned polyisocyanates. Adducts of the aforementioned polyisocyanates are also suitable, such as biuret, isocyanurate, allophonate, uretdione and mixtures thereof. Depending on the application, the above-mentioned isocyanates and their adducts may exist in the form of blocked or latent isocyanates.

In the two-component aqueous coating composition according to the present application, the amount of curing agent used as Component B can be adjusted empirically by those skilled in the part based on the amount of component A, especially the amount of film-forming resin composition in component A. In some embodiments of the present application, the weight ratio of Component A and Component B as the curing agent may be in the range of 100:5 to 100:23, for example 100:15, 100:23 or other commonly used ratios of Component A and Component B in the art.

In an embodiment according to the present application, the aqueous carrier is optional in the formulation of the aqueous coating composition. As an exemplary illustration, the optional aqueous carrier includes, but not limited to, water, alcohol solvents (such as methanol, isopropanol, isobutanol, n-propanol, n-butanol, 2-butanol, pentanol, tert-amyl alcohol, neopentanol, n-hexanol, ethylene glycol, etc.), ketone solvents (such as acetone, methyl ethyl ketone, methyl n-pentyl ketone, etc.), ether solvents (such as ethylene glycol butyl ether, etc.). In some embodiments according to the present application, the aqueous coating composition may be free of an additional aqueous carrier. In some embodiments according to the present application, the aqueous coating composition may further include a certain amount of optional aqueous carrier, so as to obtain an appropriate coating viscosity.

According to an embodiment of the present application, the amount of the optional aqueous carrier can vary within a wide range, and the total amount thereof can be in the range of about 10 wt % to about 25 wt % relative to the total weight of the component A. In some embodiments, the amount of the optional aqueous carrier can be in the range of 15 wt % to 20 wt %.

In some embodiments of the present application, as needed, the aqueous coating composition further comprises one or more pigments and fillers to impart the desired color and/or strength to the resulting paint film or coating. As used herein, the term, "pigments and fillers", is intended to refer to any coating volume extender, either organic or inorganic, in the form of e.g., particles. There is no particular limitation on the shape of particles, which may have any suitable shape. The particle size of particles may vary over a broad range, e.g., from about 10 nanometers to about 50 micrometers. In addition to functioning as a coating volume extender, some particle materials may impart one or more desired properties to the composition and/or coating resulted from the composition. For example, some particles material may impart desired color to the composition and hence the coating resulted from the composition, and in this case such particle materials may be also referred to as "pigment". Some particle materials may improve chemical and/or physical properties, in particular mechanical properties of the coating resulted from the composition, and in this case these particle materials may also be referred to as "filler".

In an embodiment of the present application, suitable exemplary pigments and fillers include, for example, kaolin, titanium oxide, calcium carbonate, diatomaceous earth, talc, barium sulfate, magnesium aluminum silicate, silica, and any combination thereof. In a preferred embodiment, the filler may include titanium oxide, kaolin, calcium carbonate, diatomaceous earth, or a combination thereof.

According to the present application, the total amount of pigments and fillers can vary within a wide range, which is for example, about 0% to about 10% by weight, preferably about 0.1 to about 8% by weight, more preferably about 0.5% by weight to about 5% by weight relative to the total weight of the component A. In some preferred embodiments according to the present application, the aqueous coating composition does not contain any pigments and fillers, and is present in the form of a clear varnish. According to an embodiment of the present application, the aqueous coating composition may optionally further include other optional additional additives commonly used in aqueous coating compositions, and these additives will not adversely affect the coating composition or the cured coating obtained therefrom. Suitable additives include, for example, those that improve the processing or manufacturing properties of the composition, enhance the aesthetics of the composition, or improve the specific functional properties or characteristics of the coating composition or the cured composition obtained therefrom, such as adhesion to the substrate. Optional additional additives that may be included are, for example, cosolvents, defoamers, leveling agents, thickeners, lubricants, anti-migration aids, anti-fungal agents, preservatives, wetting agents, anti-fungal agents, anti-rust agents, antioxidants, dispersants, adhesion promoters, UV stabilizers, pH adjusters, film forming aids or combinations thereof. The content of each optional component is sufficient to achieve its intended purpose, but preferably, such content does not adversely affect the aqueous coating composition or the paint film obtained therefrom. In some embodiments of the present application, the aqueous coating composition may further include one or more of a co-solvent, a defoamer, a leveling agent, a thickener, a surfactant, and a bactericide. In one embodiment of the present application, the aqueous coating composition may further include one or more of a co-solvent (including but not limited to dipropylene glycol monomethyl ether (DPM), dipropylene glycol monobutyl ether (DPnB)), a leveling agent, and a thickening agent.

According to the present application, the total amount of the optional additional additives can vary within a suitable range, for example, in an amount of about 0% to about 15% by weight, preferably about 0.1% to about 12% by weight, more preferably about 1% by weight to about 12% by weight relative to the total weight of the component A.

In a specific embodiment according to the present application, the component A of the aqueous coating composition comprises, relative to the total weight of the component A,
55-80% by weight of the film-forming resin composition;
2-5% by weight of at least one starch;
10-25% by weight of optional aqueous carrier; and
0-15% by weight of optional additional additives.

The preparation of the aqueous coating composition according to the present application can be achieved by any suitable mixing method known to those of ordinary skill in the art. For example, the aqueous coating composition can be made by adding the film-forming resin composition, at least one starch, optional aqueous carrier (if any), and optional additional additives (if any) to a container, and then stirring the resulting mixture uniformly, thereby forming the component A. As needed, the curing agent as the component B may exist as a single component or may be mixed with the above-mentioned components other than the film-forming resin composition so that it exists in the form of a mixture.

The aqueous coating composition of the present application can be applied by conventional methods known to those of ordinary skill in the art, for example, by knife coating, spray coating, roll coating, or other conventional coating methods known to those of ordinary skill in the art.

It was surprisingly discovered that the aqueous coating composition prepared as above can achieve an excellent haptic effect when used as a top coat. Therefore, another aspect of the present application provides a coating, which is formed from the aqueous coating composition according to the present application, and exhibits a haptic effect.

In an embodiment according to the present application, the aqueous coating composition is coated on a test panel with a wet film thickness of 150 microns and air-dried for 7 days, and the resultant paint film showed delicate and soft haptics close to the skin when tested by the test method of haptic performance described in the Examples section.

In another aspect of the present application, the present application also provides an article, comprising a substrate having at least one major surface; and at least one coating, the coating being formed from the aqueous coating composition according to embodiments of the present application which is directly or indirectly coated on the main surface.

In an embodiment of the article of the present application, the substrate may be any suitable substrate, including but not limited to: wood, metal, plastic, leather, fabric, ceramic or any combination thereof.

According to the present application, the article can be prepared, for example, by the following steps: (1) providing a substrate; (2) sequentially applying and forming one or more layers of aqueous coating composition of the present application on the substrate to provide the substrate with a haptic effect.

According to the preset application, the articles thus obtained can be used in the following end applications, including, but not limited to: consumer electronics (e.g., notebooks, mobile phone casings), wooden furniture, appliances (e.g., ovens, coffee machines), automotive interiors (e.g., panels, holders, arm rests), clothing (such as sports shoes), packaging (e.g., cosmetic bottles/caps, bags), and textured films for in-mold decoration/in-mold labeling (IMD/IML).

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available and used directly without further treatment.

Haptic properties: The aqueous coating composition was applied on an aged polyurethane panel with a wet film thickness of 150 microns and air dried for 7 days. The samples thus formed were distributed to 5 well-trained observers, each with three samples. Five observers touched the samples with their hands to judge the haptic properties of the surface. If the observer can feel at least one of the following effects: smooth/velvety effects, silky effects, rubbery and tacky effects, soft sandpaper-like effects and rough sandpaper-like effects, then the sample will be determined to have a haptic effect; otherwise, the sample will be determined not to have a haptic effect. In addition, the haptic effects can be further subdivided into the following 1-5 levels, where level 1 means "very weak haptic effect"; 2 means "slight haptic effect"; 3 means "medium haptic effect"; 4 means "obvious haptic effect"; 5 means "significant haptic effect". Then, the levels of the above tactile effects were averaged to obtain the haptic effect of each sample.

Gloss: The aqueous coating composition was applied with a wet film thickness of 150 microns on an aged polyurethane panel and air dried for 7 days. After that, the sample was tested for its 60° gloss using ASTM D523 with a BYK4565 miniature BYK gloss meter.

Scratch resistance: The aqueous coating composition was applied with a wet film thickness of 150 microns on an aged polyurethane panel and air dried for 7 days. After that, the sample was tested for its scratch resistance according to GB/T9279-2007.

Transparency: The aqueous coating composition was applied with a wet film thickness of 150 microns on an aged polyurethane panel and air dried for 7 days. After that, the sample was scored by visual comparison test, where score 5 is the best and score 1 is the worst.

Chemical resistance: The aqueous coating composition was applied with a wet film thickness of 150 microns on an aged polyurethane panel and air dried for 7 days. After that, the sample was tested for its chemical resistance according to GB/T 3324-2008 and GB/T 23999-2009 and scored, where score 5 represents the best chemical resistance, and score 0 represents the worst chemical resistance.

Raw Materials:
  Aqueous polyurethane dispersion
  Aqueous Polyurethane-polyacrylate dispersion
  Corn starch, which has an acidity of 1.47 according to GB/T8885-2008 and a fineness of 99.9% according to GB/T8885-2005, and contains 26.5% to 30.26% by weight of amylose;
  Tapioca starch, which has an acidity of 1.48 according to GB/T8885-2008 and a fineness of 99.8% according to GB/T8885-2005, and contains 15% to 19% by weight of amylose;
  Potato starch, which has an acidity of 1.48 according to GB/T8885-2008 and a fineness of 99.7% according to GB/T8885-2005, and contains 17% to 23% by weight of amylose;
  Co-solvents: dipropylene glycol monomethyl ether (DPM) and dipropylene glycol monobutyl ether (DPnB)
  Other additives: Defoamer 1 (polysiloxanes and hydrophobic solids in polyglycol)/and Defoamer 2 (silicone-containing defoamer for aqueous high gloss emulsion systems), leveling agent (siloxane-based gemini surfactant), Thickener 1 (non-ionic associative polyurethane thickener) and Thickener 2 (non-ionic associative polyurethane thickener).
  Commercially available skin-feel paint: Garpoli water-based skin-feel-paint.

Comparative Example 1

Commercially purchased ultra-matte paint: Comparative Example 2
Aqueous Coating Composition
As shown in Table 1, ingredients in the indicated amounts were mixed to form the aqueous coating composition according to Examples 1-3 and Control Example 1 of the present application wherein Examples 1-3 were aqueous coating composition comprising corn starch, tapioca starch, and potato starch respectively; Control Example 1 was aqueous coating composition free of any starch; Comparative Example 1 was a commercially available skin-feel paint and Comparative Example 2 was commercially purchased ultra-matte paint.

TABLE 1

Composition and amount of aqueous coating composition

| Raw material/g | Example 1 | Example 2 | Example 3 | Control 1 |
|---|---|---|---|---|
| Aqueous polyurethane dispersion | 65 | 65 | 65 | 75 |
| Aqueous polyurethane-polyacrylate dispersion | 10 | 10 | 10 | 10 |
| Corn starch | 10 | — | — | — |
| Tapioca starch | — | 10 | — | — |
| Potato starch | — | — | 10 | — |
| Water | 8 | 8 | 8 | 8 |
| Cosolvent | 6 | 6 | 6 | 6 |
| Other additives | 1 | 1 | 1 | 1 |
| Total | 100 | 100 | 100 | 100 |

Coating Performance

The aqueous coating compositions obtained in the above Examples 1-3, Control Example 1 and Comparative Example 1-2 were sprayed on the surface of the support substrate with a wet coating thickness of 150 microns and air-dried for 7 days, and then the resulting samples were tested according to the method of previous test section for their haptic effect, gloss, transparency, scratch resistance and chemical resistance. The results were summarized in Table 2 below.

TABLE 2 coating performance

| | Example 1 | Example 2 | Example 3 | Control 1 | Comparative Example 1 | Comparative Example 2 |
|---|---|---|---|---|---|---|
| Haptic effect | delicate and soft haptic effect close to the skin | delicate and soft haptic effect close to the skin | delicate and soft haptic effect close to the skin | No | delicate and soft haptic effect close to the skin | No |
| Haptic grade | 5 | 4 | 3 | — | 3 | — |
| Gloss | 3° | 3° | 3° | 15° | 10° | 5° |
| Transparency | 4 | 3 | 2 | 5 | 3 | 4 |
| Scare Resistance | 30 | 28 | 25 | 23 | 25 | 23 |
| Chemical Resistance | 4 | 4 | 4 | 3 | 2 | 2 |

It can be seen from the results in Table 2 that incorporating a certain amount of at least one starch into conventional emulsions, especially the mixture of aqueous polyurethane dispersion and aqueous polyurethane-acrylic resin dispersion, had obtained an aqueous coating composition having delicate and soft haptic effect close to the skin, and ultra-matte effect, whose haptic effect is equivalent to that of a currently commercially available haptic coating, and whose gloss is equivalent to, or even more preferred, that of a commercially available ultra-matte coating. Moreover, the coating formed from the aqueous coating composition of the present application had significantly better scratch resistance than the coating formed from the commercially available haptic coating composition.

Although the present application is described with reference to a large number of embodiments and examples, those skilled in the art can easily determine that changes can be made to the present application without departing from the principles disclosed in the foregoing specification. For example, without departing from the principles disclosed in the foregoing specification, multiple features or preferred manners described in the description may be combined, and the resulting technical solution should be understood as the content stated in the description. Such changes are deemed to be included in the following claims, unless the claims expressly indicate otherwise. Accordingly, the embodiments detailed herein are merely exemplary and not intended to limit the scope, which is the full scope of the appended claims and any and all equivalents thereof

What is claimed is:

1. An aqueous coating composition comprising:
   component A comprising a film-forming resin composition, starch, optional aqueous carriers and additional additives; wherein the starch is present in an amount of 2-20% by weight, in an amount of 4-10% by weight relative to the total weight of the component A, wherein the coating formed by the aqueous coating composition has a 60° gloss of no more than 5°; and
   wherein the starch has an acidity of less than or equal to 2.0 in which the acidity refers to the amount of aqueous sodium hydroxide solution with a molar concentration of 0.1 mol/L in milliliter consumed by neutralizing 10 grams of the starch without water.

2. The aqueous coating composition of claim 1, wherein the starch has a fineness of 99.5% or higher through a 100-mesh screen.

3. The aqueous coating composition of claim 1, wherein the starch comprises amylose, amylopectin or a mixture thereof.

4. The aqueous coating composition according to claim 3, wherein the starch contains amylose in an amount of 20% to 40% by weight.

5. The aqueous coating composition according to claim 1, wherein the starch is selected from one or more of corn starch, potato starch, wheat starch, rice starch, tapioca starch, oat starch, and sorghum starch.

6. The water-based coating composition according to claim 1, wherein the film-forming resin composition comprises one or more of an aqueous dispersion of acrylics resin, an aqueous dispersion of polystyrene-acrylics resin, an aqueous dispersion of polyurethane, an aqueous dispersion of polyurethane-acrylic resin, an aqueous dispersion of epoxy resin, an aqueous dispersion of polyester, an aqueous dispersion of polyvinyl acetate, and an aqueous dispersion of polysiloxane, preferably one or more of an aqueous dispersion of acrylics resin, an aqueous dispersion of polystyrene-acrylics resin, an aqueous dispersion of polyurethane, and an aqueous dispersion of polyurethane-acrylics resin, more preferably one or two of an aqueous dispersion of polyurethane and an aqueous dispersion of polyurethane-acrylics resin.

7. The aqueous coating composition according to claim 1, wherein, relative to the total weight of the component A, the component A comprises:
   55-80% by weight of the film-forming resin composition;
   2-10% by weight of the starch;
   10-25% by weight of the aqueous carrier; and
   0-15% by weight of the additional additives.

8. The aqueous coating composition according to claim 1, wherein the aqueous coating composition is substantially free of a hand-feeling agent.

9. The aqueous coating composition according to claim 1, wherein the aqueous coating composition is substantially free of a matting agent, and the coating formed by the aqueous coating composition has a 60° gloss in the range of 3° to 5°.

10. The aqueous coating composition according to claim 1, wherein the aqueous coating composition contains a matting agent, and the coating formed by the aqueous coating composition has a 60° gloss of no more than 3°.

11. The aqueous coating composition according to claim 1, further comprising a component B containing a curing agent.

12. A coating formed from the aqueous coating composition of claim 1, wherein the coating has a haptic effect.

13. An article comprising
   a substrate having at least one major surface; and
   at least one layer of coating, the coating being formed from the aqueous coating composition of claim 1 which is directly or indirectly coated on the main surface.

14. The article of claim 13, wherein the substrate comprises wood, metal, plastic, leather, fabric, ceramic, or any combination thereof.

* * * * *